United States Patent
Litt et al.

(10) Patent No.: US 6,691,207 B2
(45) Date of Patent: Feb. 10, 2004

(54) METHOD AND APPARATUS FOR IMPLEMENTING LOOP COMPRESSION IN A PROGRAM COUNTER TRACE

(75) Inventors: Timothe Litt, Southborough, MA (US); Richard E. Kessler, Shrewsbury, MA (US); Thomas Hummel, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

(21) Appl. No.: 10/034,506

(22) Filed: Dec. 28, 2001

(65) Prior Publication Data

US 2003/0126358 A1 Jul. 3, 2003

(51) Int. Cl.$^7$ ............................................. G06F 12/00
(52) U.S. Cl. ..................... 711/108; 711/118; 714/45; 717/124
(58) Field of Search ............................... 711/108, 118; 717/124; 714/45; 365/49

(56) References Cited

U.S. PATENT DOCUMENTS

| | | | | |
|---|---|---|---|---|
| 6,107,821 A | * | 8/2000 | Kelem et al. ................. 326/38 |
| 6,182,247 B1 | * | 1/2001 | Herrmann et al. ............. 714/39 |
| 6,247,147 B1 | * | 6/2001 | Beenstra et al. .............. 714/39 |
| 6,286,114 B1 | * | 9/2001 | Veenstra et al. .............. 714/39 |
| 6,389,558 B1 | * | 5/2002 | Herrmann et al. ............. 714/39 |
| 6,460,148 B2 | * | 10/2002 | Veenstra et al. .............. 714/39 |
| 6,564,347 B1 | * | 5/2003 | Mates ......................... 714/727 |
| 6,633,838 B1 | * | 10/2003 | Arimilli et al. ................ 703/16 |
| 2001/0037477 A1 | * | 11/2001 | Veenstra et al. .............. 714/41 |
| 2002/0194543 A1 | * | 12/2002 | Veenstra et al. .............. 714/39 |
| 2003/0097615 A1 | * | 5/2003 | Corti et al. .................... 714/37 |

* cited by examiner

*Primary Examiner*—Kevin Verbrugge

(57) ABSTRACT

A system is disclosed in which an on-chip logic analyzer (OCLA) includes a loop detector logic which receives incoming program counter (PC) data and detects when software loops exist. When a software loop is detected, the loop detector may be configured to store the first loop in memory, while all subsequent iterations are not stored, thus saving space in memory which would otherwise be consumed. The loop detector comprises a content addressable memory (CAM) which is enabled by a user programmed signal. The CAM may be configured with a programmable mask to determine which bits of the incoming PC data to compare with the CAM entries. The depth of the CAM also is programmable, to permit the CAM to be adjusted to cover the number of instructions in a loop.

33 Claims, 3 Drawing Sheets

METHOD AND APPARATUS FOR IMPLEMENTING LOOP COMPRESSION IN A PROGRAM COUNTER TRACE

CROSS-REFERENCE TO RELATED APPLICATIONS

This application relates to the following commonly assigned co-pending applications entitled:

Method And Apparatus For Efficiently Implementing Trace And/Or Logic Analysis Mechanisms On A Processor Chip, U.S. Ser. No. 10/034,717; An Efficient Word Recognizer For A Logic Analyzer, U.S. Ser. No. 10/034,227; and Method And Apparatus For Managing Timestamps When Storing Data, U.S. Ser. No. 10/034,462.

all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates generally to logic analyzers that are used to facilitate the design of digital logic devices. More particularly, the present invention relates to an on-chip logic analyzer capable of receiving program counter data, and of selecting some of that data for storage in an on-chip memory. Still, more particularly, the invention relates to a loop compressor for an on-chip logic analyzer, which permits software loops to be detected so that the program counter data that the memory entries are not consumed with program counter data of the software loop.

2. Background of the Invention

The design and development of digital logic circuits has become increasingly complex, due in large measure to the ever-increasing functionality offered in such circuits. Integrated circuits are constantly surpassing milestones in performance, as more and more functionality is packaged into smaller sizes. This enhanced functionality requires that a greater number of transistors be included in an integrated circuit, which in turn requires more rigorous testing to insure reliability once the device is released. Thus, integrated circuit designs are repeatedly tested and debugged during the development phase to minimize the number and severity of errors that may subsequently arise. In addition, chips may be tested to determine the performance characteristics of the device, including the speed or throughput of the chip, software running on the chip, or the aggregate performance of the system.

As integrated circuits become more complex, the length of the debug phase increases, requiring a greater lead-time before product release. In addition, as the complexity of integrated circuits increase, it becomes necessary to fabricate more prototype iterations of the silicon (or "spins" of silicon) in order to remove successive layers of bugs from the design, thereby increasing the engineering and material cost of the released product. It would be desirable to reduce these engineering and material costs and speed up the product cycle. Moreover, if the most relevant state data was available for analysis by the debugging team, the debugging phase for products could be reduced significantly, thereby minimizing cost, and enabling an earlier product launch.

One of the chief difficulties encountered during the debug phase of a product is identifying the source of an error, and obtaining relevant data regarding the conditions existing at the time of the error. This can be extremely difficult because the error may make it impossible to obtain state information from the integrated circuit. For example, in a processor, an error may cause the processor to quit executing, thus making it impossible to obtain the state data necessary to identify the source of the error. As a result, the debug process often unfortunately requires that the debug team infer the source of the error by looking at external transactions at the time of the error, instead of being able to look at the internal state data. If the internal state of the processor could be acquired and stored, these inferences would be replaced by solid data. By reducing the designer's uncertainty and increasing the available data, this would be beneficial in solving problems with the processor hardware or software.

In certain products under development, the number of transistors is exceedingly large and the dimensions are exceedingly small. In such products, the manual probing of internal terminals and traces is impractical and inaccurate. Consequently, the usual technique for testing the state of terminals and traces in highly complex chips is to route signals through the chip's external output terminals, to some external interface. This approach, however, suffers in several respects.

First, as noted above, the signals obtained from the external output terminals are removed from the signal states of the internal terminals and traces. Thus, this technique requires the debugging team to infer the state of the internal terminals and traces from signals appearing on an external bus. Second, routing the desired state to external terminals often requires more wiring, silicon, drivers, pads and power than is affordable. Attempts to do so can compromise the normal functioning of the chip. And costs escalate throughout the design, often impacting the micropackaging and system board as well as the die. Third, oftentimes the internal clock rate of the chip operates at a much higher rate than the external logic analyzers that receive and process the data. As an example, processor designs currently under development operate at clock speeds up to and exceeding 2.0 GHz. The fastest commercial logic analyzers, despite their expense, are incapable of operating at GHz frequencies. Thus, either certain data must be ignored, or some other mechanism must be employed to capture the high-speed data being generated on the chip. The typical approach is to run the chip at a slower clock speed so the data can be captured by external test equipment. This solution, however, makes it more difficult to detect the bugs and errors that occur when the chip is running at full clock speeds. Some errors that occur at full clock speed will not be detected when the clock speed is reduced to accommodate the off-chip logic analyzers. Also, increasingly the processor connects to external components that have a minimum speed, below which they will not operate. These speeds require the processor to operate faster than the external logic analyzer can accommodate.

As an alternative to sending data off-chip, attempts have been made to capture certain state data on chip, thereby reducing the problems of interfacing slower speed test equipment with high-speed devices. In this approach, history buffers, and even on-chip logic analyzers (OCLA) are provided to acquire and store event and/or time sequenced data on the chip itself. In the past, to the extent that designers sought to incorporate memory onto the chip for debug and test purposes, dedicated memory devices (usually RAM) were used. Thus, in prior art designs that attempted to capture debug and test information on-chip, a dedicated memory structure was incorporated into the chip design solely to store data for the debug and test modes. The problem with this approach, however, is that it requires the allocation of a significant amount of chip space to incorporate such dedicated memory devices, and these memory devices, while used extensively during the design and development phase of the chip, add little or nothing to the performance of the chip once it is released into production. Thus, the inclusion of dedicated memory space on the chip represents an opportunity cost, and means that functionality and/or performance is sacrificed to include this dedicated memory on the chip. Consequently, the inclusion of memory for debug purposes, while helpful in the debug and test phase, is generally viewed as undesirable because of the accompanying loss of performance and functionality that must be sacrificed. If a dedicated memory device is included on the chip, system designers normally require that such a memory be very small in size to minimize the cost increase, as well as the performance and functionality loss that accompany the inclusion of such a dedicated memory. As the size of the dedicated memory becomes smaller, so too does the prospect that the state information stored in the dedicated memory will be sufficient to assist in the debug process. Thus, as the dedicated memory space becomes smaller, so too does the probability that useful debug data will be captured. In relative terms, the largest dedicated on-chip memories typically are incapable of storing very much data.

In assignee's co-pending application entitled Method And Apparatus For Efficiently Implementing Trace And/Or Logic Analysis Mechanisms On A Processor Chip, U.S. Ser. No. 10/034,717, the teachings of which are incorporated herein, the on-chip cache memory is used to store data from the on-chip logic analyzer. The use of the on-chip cache memory as a storage device for the in-chip logic analyzer permits the storage of a relatively large amount of state data on the chip as compared to previous designs. While the use of the on-chip cache memory greatly expands the amount of state data that can be stored on-chip, the extent of data that can be stored is not limitless. Modern processors and other complex circuits often have pipelined operation, with multiple instructions being manipulated each cycle. For a processor operating at 2 GHZ, the amount of data that can be stored in a typical cache memory represents only a few microseconds of data. Consequently, if the OCLA stores all incoming data in the cache, the cache would quickly overflow, and potentially relevant data would be lost.

One of the key pieces of information used in analyzing a processor and/or the software executing on the processor is data reflecting the operation of the Program Counter (PC). The PC data provides the address of software instructions that have been fetched, executed or retired by the processor. By tracing the PC data, a list or trace can be developed of the software instruction addresses manipulated by the processor. The ability to reconstruct the software flow through a Program Counter (PC) trace is an essential tool for debugging and performance analysis of the processor and any software running on the processor. Even with the greatly expanded memory capacity available from using the on-chip cache memory, the storage of PC traces requires more memory than can be provided in a typical cache memory. Consequently, some mechanism must be developed to reduce the amount of data stored in the on-chip memory.

One of the key contributors to the memory consumption of PC traces is software loops. Software loops are fundamental constructs that are pervasively used in programming computers. A software loop is a sequence of instructions which are performed iteratively (possibly with some iteration-to-iteration variation) in the execution of a program. The instructions are generally compact. Such machine instructions are generated by programming constructs such as "do", "for" and "while" in the C programming language. Equivalents exist in all procedural languages, and non-procedural languages generate these structures implicitly.

Unfortunately, while software loops consume a great amount of memory, they typically yield very little information. Once the debugger knows that a loop has been encountered, tracing additional iterations of the loop may provide little or no additional information. The problem is that tracing each iteration of the loop often displaces the trace of code that preceded the loop, so that the only PC data available to the debugger is successive iterations of the loop addresses.

It would be desirable if a system or technique was developed that would permit software loops to be detected and which eliminated multiple iterations of a software loop from being stored in memory as part of a PC trace. It would also be advantageous if the system or technique that was capable of detecting a software loop was capable of implementation in a small space, to permit inclusion on-chip as part of an on-chip logic analyzer. Despite the apparent advantages such a design would offer, to date no viable solution has appeared.

BRIEF SUMMARY OF THE INVENTION

The problems noted above are solved in large part by an on-chip logic analyzer that includes loop compression logic to monitor the address of a program counter and to only store addresses that have not been recently issued. The loop compressor comprises a content addressable memory (CAM) that when enabled issues a hit/miss signal depending on whether the incoming instruction address is already present in the CAM. The hit/miss signal is used to signal the memory regarding whether the incoming instruction address should be stored. If the instruction address is already present in the CAM, the CAM signals a hit, and the memory does not store the instruction. If the instruction is not present in the CAM, the CAM signals a miss, enters the new address into the CAM, and the memory stores the instruction, assuming any other OCLA conditions are satisfied.

According to the preferred embodiment of the invention, a CAM is provided as part of an OCLA and is used to detect software loops and other software instructions that are of a recurring nature. The CAM preferably has a programmable depth, and thus can store a variable number of instructions. The depth of the CAM can be made very shallow to permit vary fine analysis of the program counter trace, or can be made relatively deep (depending on the amount of space available to implement the CAM) to provide coarser control and ability to detect and filter software loops with many instructions.

According to another aspect of the present invention, a programmable mask may be used in conjunction with the CAM to select particular bits of the instruction to examine. This provides greater power to the CAM, and enables the user to define boundaries to use for the CAM matching. By masking certain bits from the CAM comparison, instruction addresses can be grouped together for consideration, thus reducing the number of CAM entries that is necessary to cover a loop. Thus, for example, if the lower order bits were masked, then any instruction address that was stored in the CAM would cause a hit signal to issue if any other instruction address was presented to the CAM in which the higher order bits matched.

The ability to program the CAM with a mask value, and with a desired depth provides a great deal of flexibility to the user in filtering out software loops. To simplify the design, the CAM preferably uses a FIFO scheme to handle data organization. A new incoming instruction address that does not generate a hit is stored in the first entry in the CAM. As new entries are added to the CAM, each entry is displaced one position in the CAM, until ultimately it is dropped out of the CAM. The FIFO approach reduces the wiring requirements of the CAM since wires can be run to just a single entry from the incoming data bus, and each other entry spills to the adjacent entry.

These and other aspects of the present invention will become apparent upon reading the detailed description of the preferred embodiment and the appended claims.

BRIEF DESCRIPTION OF THE DRAWINGS

For a detailed description of the preferred embodiments of the invention, reference will now be made to the accompanying drawings in which.

NOTATIONS, NOMENCLATURE AND INTERPREATIONAL ISSUES

Certain terms are used throughout the following description and claims to refer to particular system components. As one skilled in the art will appreciate, computer and microprocessor manufacturers and fabrication houses may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the terms "couple," "couples," "connect," or "connects" are intended to mean either an indirect or direct electrical connection. Thus, if a first device "couples" to a second device, that connection may be through a direct electrical connection, or through an indirect electrical connection via other devices and connections. The terms "microprocessor" and "processor" are used interchangeably to refer to an integrated circuit that contains logic elements for manipulating data and for making decisions based on executable software. It should be understood that although the present invention is described in the context of the preferred embodiment, which is implemented as a processor, the present invention has broader application and can be used with any digital logic device that includes on-chip memory, and which must either be debugged or tested prior to release. Thus, the present invention and claims should not be limited to a microprocessor only, unless so specified expressly in the claims. It should also be understood that there are multiple aspects to the invention disclosed herein, and that these aspects may independently merit patentability. Thus, if the claims do not expressly include a feature of the present invention, the intent is that any omitted features not form part of the claim, and that the claim instead focuses on some other aspect of the invention.

DETAILED DESCRIPTION OF THE PREFERRED EMBODIMENTS

Figure 1:
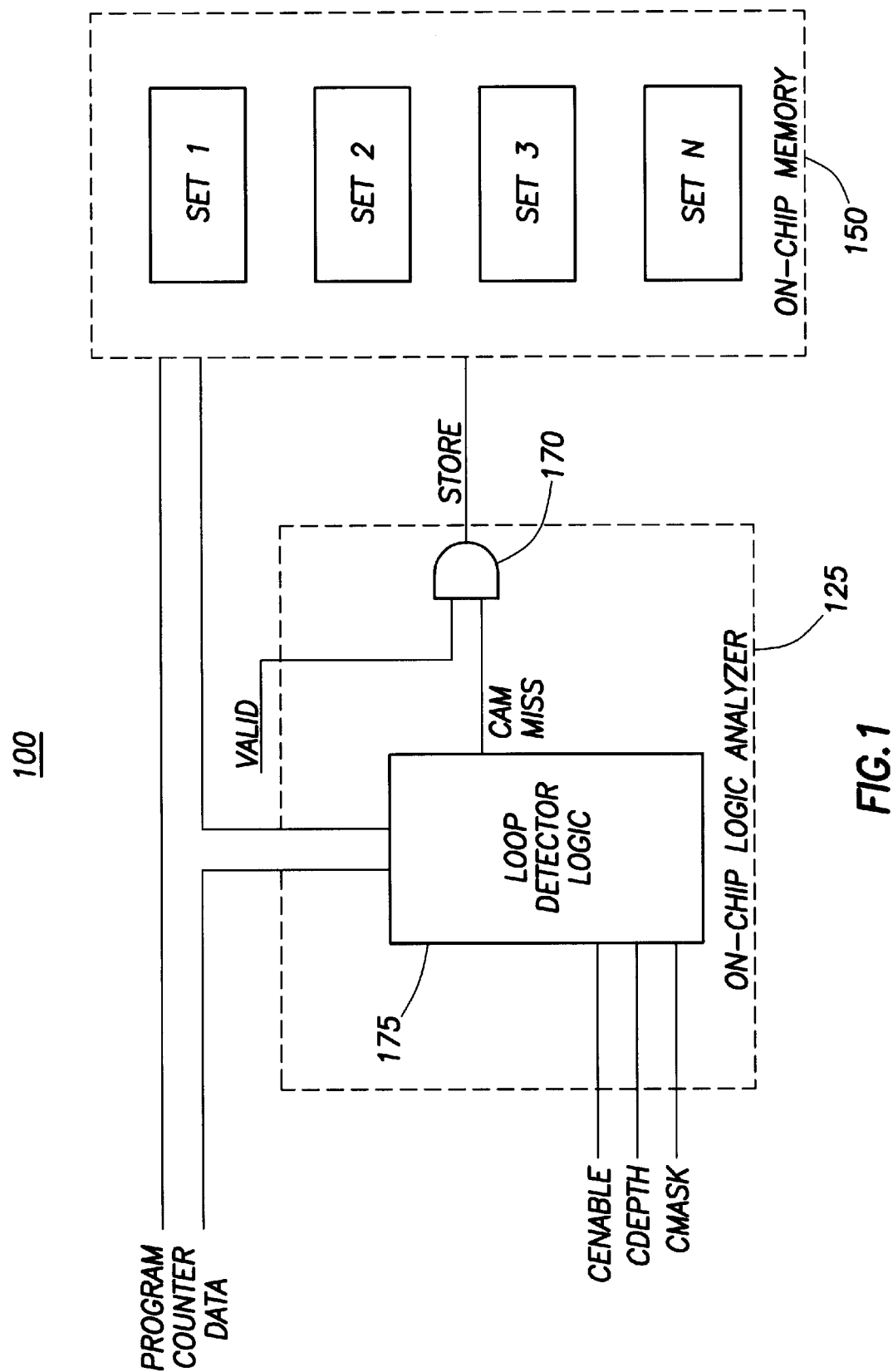
FIG. 1 shows an integrated circuit constructed in accordance with the preferred embodiment that includes an on-chip logic analyzer with a loop detector logic, and an on-chip memory for storing internal state data in response to a signal from the loop detector logic.

Referring initially to FIG. 1, the present invention constructed in accordance with the preferred embodiment generally comprises an integrated circuit 100 that includes an on-chip logic analyzer 125 coupled to an on-chip memory device 150. In accordance with the preferred embodiment, the on-chip memory device 150 comprises an on-chip cache memory, and the integrated circuit comprises a processor. Various other devices may reside on the processor, including without limitation a memory controller (not shown) that controls accesses to a system memory (not shown), an I/O interface (not shown), and various other logical devices that interface with other components normally implemented in a computer system. In addition, the processor may be designed to operate in a multiple processor environment, and thus may include one or more interfaces for coupling to other processors in a computer system.

According to the exemplary embodiment, the cache memory 150 is segmented into a plurality of cache sets. N such cache sets are shown in FIG. 1 to indicate that the number of cache sets included in the cache memory 150 may vary as desired by the system designer. Each of the cache sets stores multiple lines of data, and each line of data comprises four doublewords, with each doubleword including 32 bits. Thus, each line in a cache set has 128 bits for storing data, plus any error checking and correction (ECC) bits. According to the exemplary embodiment, one or more of the cache sets may be disabled and used exclusively by the on-chip logic analyzer 125 during periods when the integrated circuit 100 is in a debug mode. During other periods when the integrated circuit is functioning in a normal operational mode, the cache sets are all used by the core logic of the integrated circuit to maximize performance. Thus, one or more of the cache sets may be selectively placed under the ownership of the on-chip logic analyzer. When the chip is placed in a debug mode, the disabled cache set stores internal state data selected by the on-chip logic analyzer 125, which subsequently can be retrieved by the user and analyzed as part of the debug process.

The on-chip logic analyzer (OCLA) 125 is specifically designed to facilitate the debugging of the processor both during the design and development phase, and during use in the field by customers. Thus, according to the preferred embodiment, the OCLA 125 includes logic for more efficiently debugging the chip hardware and any software that is executing on the processor. Although shown in the block diagram of FIG. 1 as being located within a single location, it should be understood that the logic for OCLA 125 (and other logic shown in FIG. 1) may be distributed throughout the chip.

Referring still to FIG. 1, the OCLA 125 preferably receives data regarding the state of various hardware devices, and the address of software instructions being fetched and/or executed in the core logic of the integrated circuit 100. Thus, according to the preferred embodiment, the OCLA 125 may couple to various busses in the integrated circuit, and may also connect directly to certain logical devices within the integrated circuit to receive internal state data reflecting the operation of the core logic in the integrated circuit. According to the preferred embodiment, the OCLA 125 preferably is capable of filtering the state data it receives from the core logic in the integrated circuit, and of selecting the data to be stored in the on-chip memory device 150. The OCLA 125 may include various logical units that permit the OCLA 125 flexibility in filtering and selecting useful data, in a manner analogous to an external logic analyzer.

According to the preferred embodiment of the present invention, the OCLA 125 includes at least one loop detector logic 175 that functions to detect a software loop in the program counter trace, and which provides a signal to the memory 150 indicating that repeated iterations of the loop need not be stored. The output terminal of the loop detector logic 175 couples to AND gate 170. The output of the AND gate 170 controls whether the memory will store the incoming PC data. The other input of the AND gate receives a signal indicating if the PC data is valid.

Figure 2:
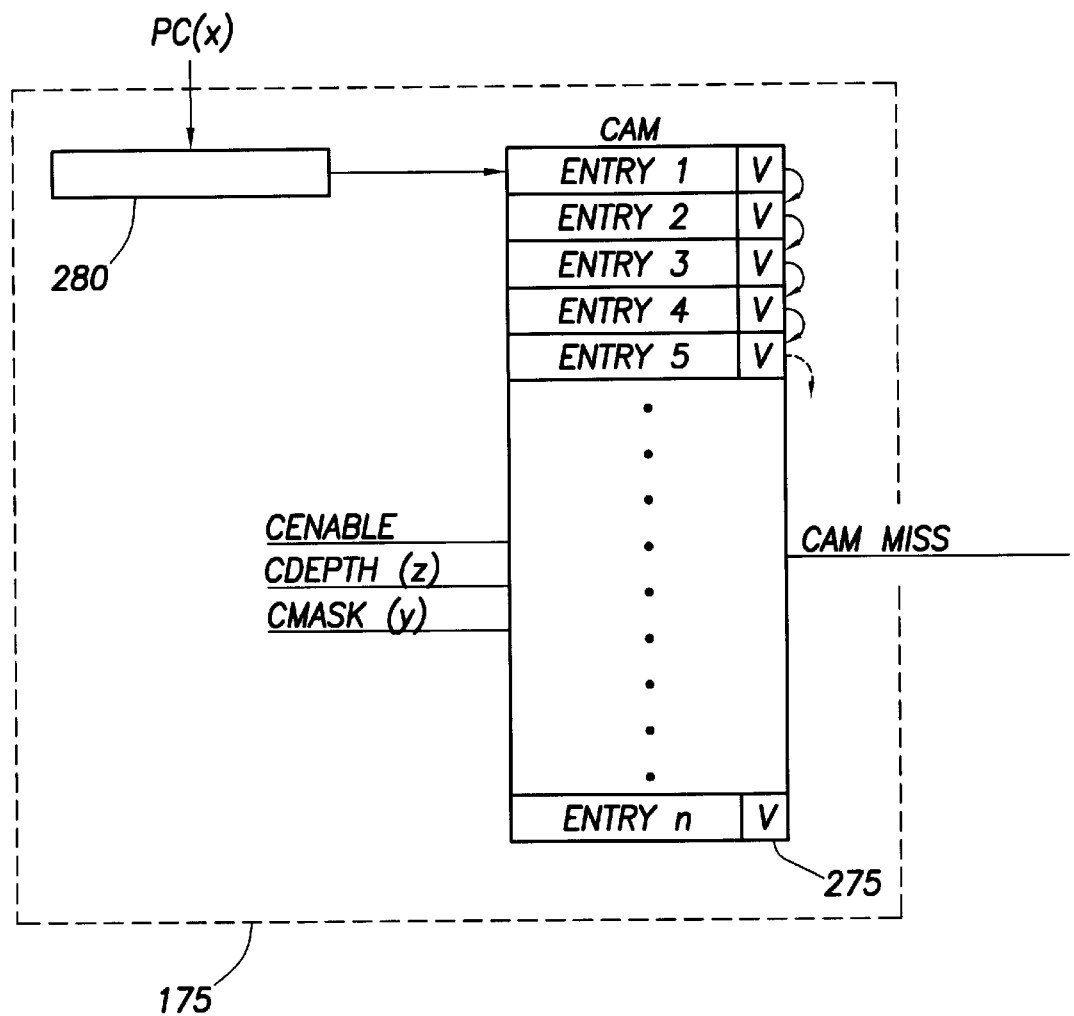
FIG. 2 is an illustration of the loop detector logic of FIG. 1.

Referring now to FIGS. 1 and 2, the loop detector logic 175 preferably comprises a content addressable memory 275, with an associated input buffer 280, although it is possible that the new PC data may be input directly to the content addressable memory 275. The content addressable memory (CAM) includes n entries, which store PC data. The number of entries in the CAM 275 preferably is programmable by the user, up to some predetermined amount that is determined by the system designer. According to the preferred embodiment, each CAM entry includes a word valid bit (indicated as v in FIG. 2), which indicates if the CAM entry is valid. The word valid bit prevents hits on CAM entries that have not been written into the CAM since the start of acquisition. The use of the Valid bit thus prevents the CAM from erroneously failing to store instruction addresses early in an acquisition. The start of an acquisition mode clears all the valid bits, thereby indicating that none of the values are valid. Each subsequent CAM Miss assertion causes a 1 to be shifted into the first entry—which is then daisy-chained along with the data bits. Incoming PC data of width x is stored in the buffer 280 preferably for one clock cycle. While the PC data is stored in buffer 280, the contents of buffer are compared to each of the entries in the CAM 275 to determine if the PC data is already present in the CAM. If a new incoming instruction address fails to match a valid instruction address in the CAM 275, then the CAM 275 issues a Miss signal, which causes the output of AND gate 170 to be asserted if the incoming data is valid (i.e., the VALID signal is asserted). As a result of the assertion of the Miss signal, the on-chip memory 150 will store the incoming instruction address and the incoming instruction address is entered into the CAM. If conversely, the incoming address signal matches any addresses stored in the CAM 275, then the loop detector logic deasserts the Miss signal, which will cause the output terminal of the AND gate 170 to go to a low voltage state, and thus the PC data will not be stored in the memory 150 and the CAM will not be updated.

Figure 3:
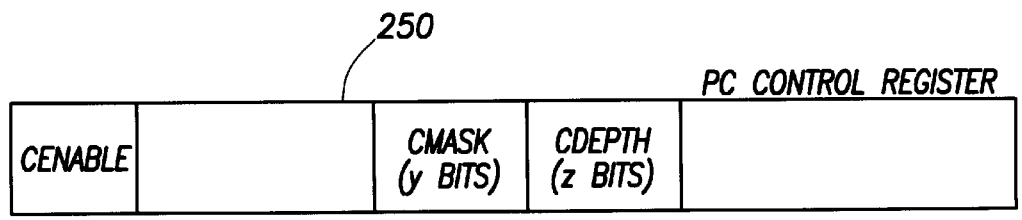
FIG. 3 is a illustration of a PC control register that controls the operation of the CAM of FIG. 2.

The CAM 275 preferably is capable of being selectively activated by the user, and thus receives an Enable (CEnable) signal from PC Control Register 250 (FIG. 3). According to the preferred embodiment, the CAM 275 also preferably receives a multi-bit Mask (CMask) signal from PC Control Register 250 (FIG. 3) that indicates which of the PC data bits should (or should not) be considered when comparing the incoming PC data with the instruction addresses stored in the loop detector logic 175. The Mask signal has a width y that may be the same as the width of the PC data signal x, or may have fewer bits corresponding to particular bits of the PC data. If all of the Mask signal bits are deasserted (which according to normal convention may be indicated by a binary "0"), then no masking is performed. If any of the Mask signal bits are asserted (which may be indicated by a binary "1"), then those bits are not considered when the PC data is compared to the instruction addresses present in the CAM 275. The Mask signal may thus be used by the user to define the granularity with which instruction addresses are to be compared in the CAM. As an example, assume the PC data has a width of 40 bits, and the Mask signal indicates that the least significant 8 bits of the PC data are to be masked. As a result, if any instruction address is placed in the CAM 275, then no other instruction address will be stored in memory if the uppermost 32 bits match this prior stored instruction address. Any discrepancy between the lower 8 bits is masked by the Mask signal. The mask, therefore, permits the user to group particular instruction addresses in order to gain more effective depth from the CAM. In the example cited, masking the lower 8 bits permits a single CAM entry to remember whether or not any of 256 addresses have been presented recently. If the mask were not present, each CAM entry could only remember a single address.

Referring still to FIGS. 1 and 2, according to the preferred embodiment, the depth of the CAM 275 also is programmable. The CAM preferably receives a Depth (CDepth) signal from PC Control Register 250 that indicates the number of entries that will be available in the CAM 275. The Cdepth signal may comprise a multi-bit signal to provide a larger number of alternative depths, which preferably permit the user to select from 1 to the n entries. The number of entries to permit in the CAM 275 effects the ability of the CAM to filter out repeated instructions. A CAM with n entries can detect and filter out a software loop with n instructions without any masking. As an example, assume that the CAM is programmed with 4 entries. Assume the PC data specifies an instruction address of 100(hexadecimal), 101, 102, and 103, and then loops back to 100 and repeats 499 times. A CAM 275 with four entries will issue a Miss (deassert Hit) signal when the instruction addresses 100, 101, 102 and 103 are received on the first cycle of the loop, and thus these instruction addresses will be stored in memory. Thereafter, the CAM will issue a Hit signal on every subsequent iteration of the loop, since those instruction addresses are already present in the CAM, and the Store signal will be deasserting. Consequently, the memory will not store the 499 iterations of the loop after the first. Because these instruction addresses are all adjacent and aligned on a power of two boundary, the Mask signal also could be used to mask the four lowermost bits, which would cause only the first 100 instruction address to be stored. When the addresses are not aligned, more that one CAM entry will be used. In the example cited, 2 CAM entries will be used.

Referring now to FIG. 2, the CAM preferably operates according to a FIFO (first-in, first-out) regimen. Thus, when a new instruction address is received, the CAM stores the new instruction address in the first CAM entry, and all of the other CAM entries would be shifted to the next-adjacent entry. Thus, the instruction entry in entry #1 would shift to entry #2, and entry #2 would shift to entry #3, and so on. The instruction entry in entry #n would be displaced from the CAM 275. While other algorithms could be used instead of FIFO, such as LRU (least recently used), the FIFO scheme minimizes the number of wires that must routed to the CAM entries, thereby reducing the size of the CAM, which may be beneficial if the CAM is located on-chip.

Figure 4:
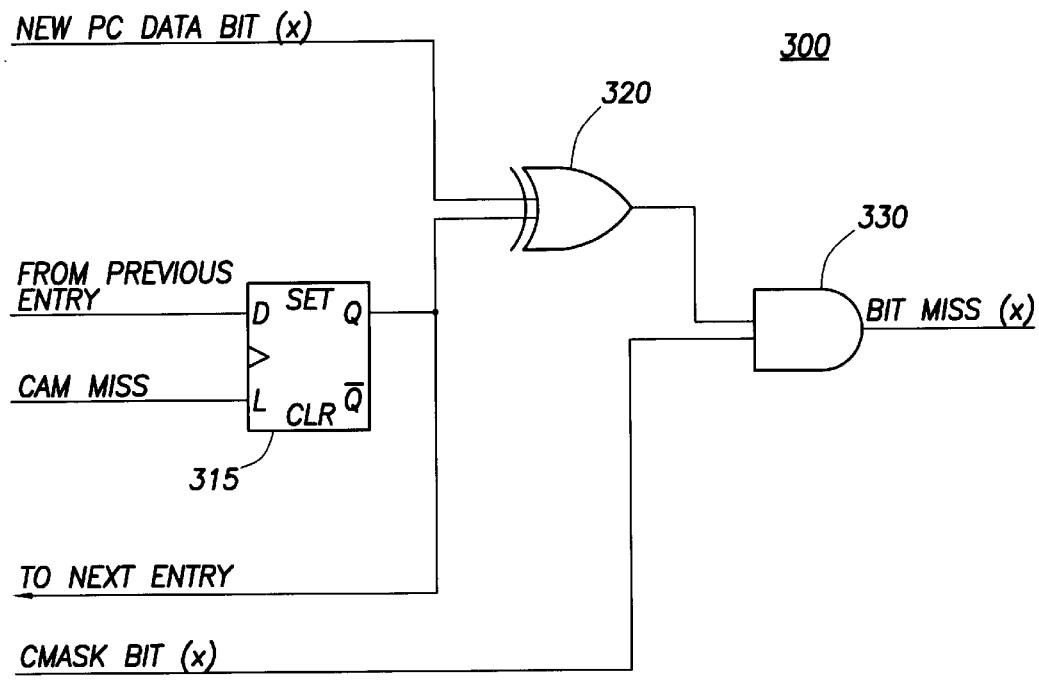
FIG. 4 is a schematic drawing of an exemplary implementation of a representative bit of the CAM of FIG. 2.

According to the exemplary embodiment, the CAM entries are connected similar to a shift register to implement the FIFO scheme, and to minimize the number of gates and wires in the design. Referring now to FIG. 4, each CAM entry comprises a number of bits that are capable of holding a data bit from a previously issued instruction address, and of comparing that bit with a bit of a new instruction address. One such CAM data bit 300 is represented in the exemplary embodiment of FIG. 4. Each CAM entry bit comprises a flip-flop 315 to hold the stored CAM value, an XOR gate 320 to determine equivalence between the CAM bit and the corresponding new PC data bit, and an AND gate 330 that receives the corresponding mask bit and the output of the XOR gate 320. If the new incoming data bit matches the stored data bit value, or if the data bit is masked, then the AND gate 330 goes to a low voltage state (Bit Miss is de-asserted). If the XOR gate 320 detects that the new PC data bit does not match the stored bit, then the XOR gate output goes high. If the XOR gate 320 goes high and the CMask signal also is asserted, indicating this bit should be considered, then the AND gate 330 produces a high voltage output signal, thereby asserting the Bit Miss(x) signal, where x represents the data width of each CAM entry. According to the preferred embodiment, each of the bits in a CAM entry (or word) is compared in similar fashion to each corresponding bit of the incoming PC data. If desired, only selected bits of the CAM may be compared with corresponding bits in the CAM word. If the CAM has a data width x, then preferably x Bit Miss signals are produced for each CAM word.

Figure 5:
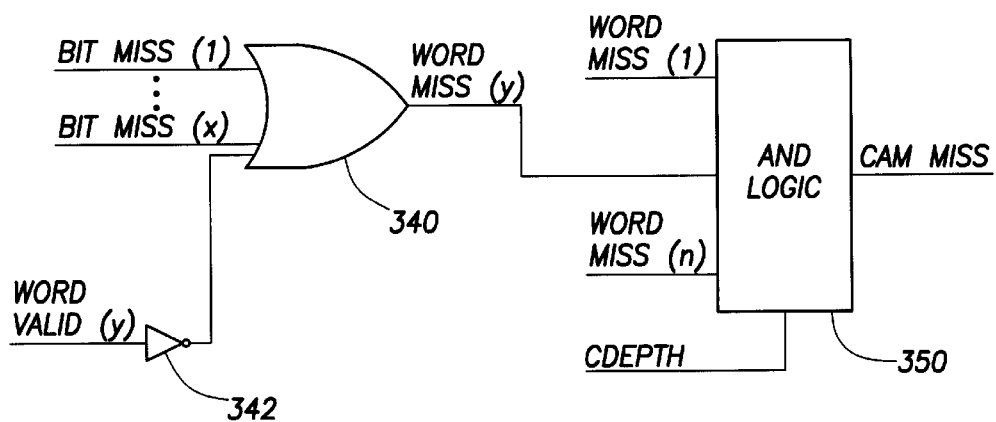
FIG. 5 is a schematic drawing of an exemplary implementation illustrating the manner in which the individual bits of a CAM word or combined together to produce a signal indicating a CAM miss.

Referring now to FIG. 5, each of the Bit Miss(x) signals for a particular CAM entry (or word) are combined in an OR gate 340. Thus, if any of the unmasked bits for a particular CAM entry have an asserted Bit Miss signal, indicating a failure to match the corresponding bit in the incoming PC data, the output of the OR gate 340 goes high. If all the Bit Miss signals are low, indicating that all bits matched or were masked for a particular CAM entry, then the output of OR gate 340 goes low. As shown in FIG. 5, the output of OR gate produces a Word Miss(y) signal, which is a single bit value indicating if a match occurred between a word (or entry) of the CAM and the incoming PC data. Each of the n CAM entries generates a Word Miss signal, indicating if the new PC data matched that entry of the CAM. Each of the Word Miss signals are combined with the valid bit for that CAM word, which preferably is stored in the CAM entry with the word. According to the exemplary embodiment of FIG. 5, the word valid bit is inverted in an inverter 342, and provided as an input to the OR gate 340. Thus, OR gate 340 provides a high output signal if any Bit Miss signal is asserted or if the word valid bit is not set, thus indicating the CAM entry does not have a valid match with the new PC data. According to the exemplary embodiment of FIG. 5, all of the Word Miss signals are combined together in AND logic 350. Thus, as shown in FIG. 5, Word Miss(1)–Word Miss(n) are applied to the AND logic 350. Word Miss(1) represents the first CAM entry, while Word Miss(n) represents the last CAM entry. Also shown, for purposes of understanding the present invention, is Word Miss(y), which represents the entry value encoded in the CDepth signal, which also is applied to AND logic. As will be understood by one skilled in the art, y may be programmed as 1, n, or any value in between. The CDepth value indicates which of the Word Miss signals will be ANDed together in the AND logic 350. Any values greater than the CDepth value will not be considered by AND logic 350. Thus, by way of example, if the user programs the CAM with a depth of 5, then the CDepth will be set equal to 5. If the CAM has 16 possible entries (n=16), then CAM entries 6–16 will not be considered by AND logic, and only CAM entries 1–5 (Word Miss(1)–Word Miss(5)) will be ANDed together in AND logic 350. The output of AND logic represents the CAM Miss signal, which is combined with AND gate 170 (FIG. 1) to generate the Store signal. It should be understood that the logic depicted in FIGS. 4 and 5 may be implemented using other logic gates, or may be implemented in firmware, without departing from the principles set forth herein.

Referring to FIG. 3, the user programmable values of CEnable, CMask, and CDepth are all preferably located within a PC Control register 250. As shown in FIG. 3, a single bit is used to encode the CEnable value. The CMask preferably comprises a multi-bit signal that is encoded with y bits, while CDepth is encoded with z bits. It should be understood that the location and width of these signals is arbitrary, and is not intended to limit the scope of the present invention.

The above discussion is meant to be illustrative of the principles and various embodiments of the present invention. Numerous variations and modifications will become apparent to those skilled in the art once the above disclosure is fully appreciated. For example, although the present invention has been described in the context of storing program counter data, it should be understood that the principles of the present invention may be used to detect looping of any type of data, and not just instruction addresses. As one skilled in the art will appreciate, similar looping may occur in data memory access patterns. For example, an instruction loop that updates a memory array will tend to reference contiguous memory locations corresponding to that array. Thus, the mechanism described may also apply to address data gathered by an on-chip logic analyzer or similar device. It is intended that the following claims be interpreted to embrace all such variations and modifications.

What is claimed is:

1. An integrated circuit fabricated on a chip, comprising:
an on-chip logic analyzer including a loop detector;
an on-chip memory capable of storing data selected by said loop detector;
wherein said loop detector includes a content addressable memory that compares incoming data with data stored in the content address memory, and which generates a store signal if the incoming data does not match the data stored in the content addressable memory.

2. The system of claim 1, wherein the content addressable memory has a programmable depth, and wherein said content addressable memory receives a depth signal that indicates the programmed depth value for the content addressable memory.

3. The system of claim 1, wherein the content addressable memory has an associated mask that determines which bits of the incoming data should be considered when comparing to the data stored in the content addressable memory.

4. The system of claim 1, wherein the content addressable memory stores incoming data if it does not match the data stored in the content addressable memory.

5. The system of claim 4, wherein the content addressable memory stores data in a first-in, first-out manner.

6. The system of claim 1, wherein the on-chip memory comprises a cache memory.

7. The system of claim 1, wherein said content addressable memory compares only selected bits of the incoming data with corresponding bits of data stored in the content addressable memory, and wherein said content addressable memory generates the store signal if the selected bits of the incoming data do not match the corresponding bits of the data stored in the content addressable memory.

8. A system for storing program counter trace information, comprising:
- a content addressable memory that compares a new instruction address with instruction addresses stored in the content addressable memory, and which generates a store signal if the new instruction address does not match the instruction addresses stored in the content addressable memory;
- a memory device that receives the store signal and stores the new instruction address; and
- wherein the content addressable memory has a programmable depth, and wherein said content addressable memory receives a depth signal that indicates the programmed depth value for the content addressable memory.

9. The system of claim 8, wherein the content addressable memory has an associated mask that determines which bits of the new instruction address should be considered when comparing to the instruction addresses stored in the content addressable memory.

10. The system of claim 9, wherein the content addressable memory stores said new instruction address if it does not match the instruction addresses stored in the content addressable memory.

11. The system of claim 10, wherein the content addressable memory stores the instruction addresses in a first-in, first-out manner, so that said new instruction address is loaded in the first entry of the content addressable memory, each entry of the content addressable memory is shifted to the adjacent entry, and the last entry of the content addressable memory is displaced.

12. The system of claim 9, wherein at least one of the bits of each content addressable memory comprises a memory element that stores a bit of the instruction address, an exclusive-OR gate that compares the stored data to a corresponding bit of the new instruction, and an AND gate that receives the output of the exclusive-OR gate and a corresponding bit of an associated mask signal.

13. A system for storing program counter trace information, comprising:
- a content addressable memory that compares a new instruction address with instruction addresses stored in the content address memory, and which generates a store signal if the new instruction address does not match the instruction addresses stored in the content addressable memory;
- a memory device that receives the store signal and stores the new instruction address; and
- wherein the content addressable memory has an associated mask that determines which bits of the new instruction address should be considered when comparing to the instruction addresses stored in the content addressable memory.

14. The system of claim 13, wherein the content addressable memory deasserts the store signal if the new instruction does match an instruction address stored in the content addressable memory.

15. The system of claim 14, wherein the content addressable memory does not store said new instruction address if it matches an instruction address stored in the content addressable memory.

16. A processor, comprising:
- an on-chip logic analyzer including a loop detector;
- an on-chip memory that receives a store signal from the loop detector and in response stores new program counter data;
- wherein said loop detector includes a content addressable memory that compares new program counter data with program counter data stored in the content addressable memory, and which deaaserts the store signal if the new program counter data matches the program counter data stored in the content addressable memory.

17. The processor of claim 16, wherein the content addressable memory has a programmable depth, and wherein said content addressable memory receives a depth signal that indicates the programmed depth value for the content addressable memory.

18. The processor of claim 16, wherein the content addressable memory has an associated mask that determines which bits of the new program counter data should be considered when comparing to the program counter data stored in the content addressable memory.

19. The processor of claim 16, wherein the content addressable memory asserts the store signal if the new program counter data does not match the program counter data stored in the content addressable memory and stores the new program counter data in the content addressable memory.

20. The processor of claim 19, wherein the content addressable memory stores program counter data in a first-in, first-out manner.

21. The processor of claim 18, wherein at least one of the bits of each content addressable memory comprises a memory element for storing a bit of the program counter data, an exclusive-OR gate that compares the stored data to a corresponding bit of the new program counter data, and an AND gate that receives the output of the exclusive-OR gate and a corresponding bit of an associated mask signal.

22. A processor, comprising:
- an on-chip logic analyzer that receives new program counter data from core logic in the processor, said on-chip logic analyzer including a loop detector that generates a store signal indicating when the new program counter data should be stored; and
- wherein said loop detector includes a content addressable memory that compares the new program counter data with program counter data previously stored in the content address memory, and which de-asserts the store signal if the new program counter data matches the program counter data stored in the content addressable memory.

23. The processor of claim 22, wherein the content addressable memory has a programmable depth, and wherein said content addressable memory receives a depth signal that indicates the programmed depth value for the content addressable memory.

24. The processor of claim 22, wherein the content addressable memory has an associated mask that determines which bits of the new program counter data should be considered when comparing to the program counter data stored in the content addressable memory.

25. The processor of claim 22, wherein the content addressable memory asserts the store signal if the new program counter data does not match the program counter data stored in the content addressable memory and stores the new program counter data in the content addressable memory.

26. The processor of claim 22, wherein the content addressable memory stores program counter data in a first-in, first-out manner.

27. The processor of claim 22, wherein at least one of the bits of each content addressable memory comprises a memory element that stores a bit of the program counter data, an exclusive-OR gate that compares the stored data to a corresponding bit of the new program counter data, and an AND gate that receives the output of the exclusive-OR gate and a corresponding bit of an associated mask signal.

28. The system of claim 22, wherein the processor includes an output port, and wherein said store signal is transmitted off-chip via said output port.

29. The system of claim 28, further comprising a memory device coupled to said processor, and wherein said memory device receives said store signal and stores the new program counter data if said store signal is asserted.

30. The system of claim 1, wherein said content addressable memory includes a plurality of entries, each of which is capable of storing program counter data, and wherein each entry in the content addressable memory has an associated word valid bit indicating if the data stored in that entry is valid.

31. The processor of claim 16, wherein said content addressable memory includes a plurality of entries, each of which is capable of storing program counter data, and wherein each entry in the content addressable memory has an associated word valid bit indicating if the data stored in that entry is valid.

32. The processor of claim 22, wherein said content addressable memory includes a plurality of entries, each of which is capable of storing program counter data, and wherein each entry in the content addressable memory has an associated word valid bit indicating if the data stored in that entry is valid.

33. The system of claim 12, wherein said memory element comprises a flip-flop.

* * * * *